US011378474B2

(12) United States Patent
Sheth et al.

(10) Patent No.: US 11,378,474 B2
(45) Date of Patent: Jul. 5, 2022

(54) PREDICT BRAKE HORSEPOWER FOR A PUMP FOR VISCOUS APPLICATIONS

(71) Applicant: Halliburton Energy Services, Inc., Houston, TX (US)

(72) Inventors: Ketankumar Kantilal Sheth, Tulsa, OK (US); Robert Charles de Long, Sand Springs, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 316 days.

(21) Appl. No.: 16/731,240

(22) Filed: Dec. 31, 2019

(65) Prior Publication Data

US 2021/0199523 A1 Jul. 1, 2021

(51) Int. Cl.
*G01L 3/24* (2006.01)
*F04D 27/00* (2006.01)

(52) U.S. Cl.
CPC .............. *G01L 3/24* (2013.01); *F04D 27/001* (2013.01)

(58) Field of Classification Search
CPC .................................. G01L 3/24; F04D 27/00
See application file for complete search history.

(56) References Cited

U.S. PATENT DOCUMENTS

| 6,776,584 B2 | 8/2004 | Sabini et al. | |
| 2003/0129062 A1* | 7/2003 | Sabini ................. | F04D 15/0088 417/22 |
| 2009/0044953 A1 | 2/2009 | Sheth et al. | |
| 2012/0118638 A1* | 5/2012 | Orbell ..................... | E21B 44/04 175/48 |
| 2012/0270325 A1 | 10/2012 | Sperry et al. | |
| 2017/0002644 A1 | 1/2017 | Chen et al. | |
| 2018/0252566 A1* | 9/2018 | Fjalestad ................... | G01F 1/74 |
| 2018/0340416 A1* | 11/2018 | Nemoto .............. | E21B 41/0007 |

FOREIGN PATENT DOCUMENTS

KR 101173049 B1 8/2012

OTHER PUBLICATIONS

Paternost et al., Experimental Study of a Centrifugal Pump Handling Viscous Fluid and Two-Phase Flow, May 2015 SPE Production & Operations, pp. 146-155. (Year: 2015).*
Wilson et al. Effect of viscosity and two phase liquid-gas fluids on the performance of multistage centrifugal pumps. In: 3rd joint US-European fluids engineering division summer meeting, Montreal, Canada, Aug. 1-5, 2010. (Year: 2010).*

* cited by examiner

*Primary Examiner* — John E Breene
*Assistant Examiner* — Liam R Casey
(74) *Attorney, Agent, or Firm* — John Wustenberg; Parker Justiss, P.C.

(57) ABSTRACT

This disclosure presents a dimensionless relationship between a fluid flow rate, a viscosity, and a brake horsepower (BHP) in a pump operation and a method that uses the dimensionless relationship to predict a BHP for viscous performance of a pump from water performance specifications. Using the dimensionless relationship, i.e., K-R number, the methods determine a BHP correlation that allows the prediction of the BHP specification to satisfy a pump performance metric at any given speed, flow rate, and viscosity. This prediction can be calculated from water performance specifications without physically testing the pump in the viscous implementation environment.

20 Claims, 8 Drawing Sheets

US 11,378,474 B2

PREDICT BRAKE HORSEPOWER FOR A PUMP FOR VISCOUS APPLICATIONS

TECHNICAL FIELD

This application is directed, in general, to determining pump parameters and, more specifically, to determining a brake horsepower (BHP) of a pump for provided design parameters.

BACKGROUND

Centrifugal pumps have been developed and used for centuries in handling viscous fluids. Performance of a centrifugal pump is affected by many factors such as viscosity, speed (rotations per minute), stage diameter, flow rate, and hydraulic design of the pump. Generally, a pump is tested in water at atmospheric conditions and its performance, as measured at one or two fixed speeds, is used for the selection of the pump type and a number of pump stages. Predicting a performance of a pump in a viscous application, e.g., where the pumped fluid has a higher viscosity than water, may be difficult as the performance is dependent upon the speed of the pump, viscosity of the fluid, and the fluid flow rate. For a given viscous application, a pump is generally tested using various viscosity fluids at a range of speeds and its test data is interpolated. This testing has been found to be lengthy and costly. Additionally, interpolating and modelling the performance for use in a practical application can be a complex process and can introduce inaccuracies in the prediction of the performance.

SUMMARY

In one aspect a method to predict a design BHP of a pump is disclosed. In one embodiment, the method includes: (1) selecting a design RPM of the pump, (2) computing an original K-R number using a viscosity of a fluid, and an original flow rate and a first BHP of the pump, wherein the computing is performed under controlled environmental conditions, (3) generating a normalized K-R number utilizing the original K-R number and a BEP K-R number, and a normalized flow rate utilizing the original flow rate and a BEP flow rate, wherein the BEP K-R number and the BEP flow rate are computed for the pump using water performance specifications, and (4) calculating the design BHP for the design RPM, wherein a BEP BHP is determined for the design RPM, and the design BHP is equal to ((the normalized flow rate^B*the BEP BHP)/the normalized K-R number), wherein B is equal to two when the viscosity is an absolute viscosity and B is equal to one when the viscosity is a kinematic viscosity.

In a second aspect, a system to determine a design BHP of a pump is disclosed. In one embodiment, the system includes: (1) an interface capable of receiving benchmark specifications for the pump, and receiving user inputs, and (2) a BHP predictor, communicatively coupled to the interface and the memory, capable of computing one or more types of K-R numbers for a design RPM, determining BEP parameters, converting fluid viscosity, converting flow rates, normalizing the K-R numbers and the flow rates, and calculating a design BHP, utilizing benchmark specifications.

In a third aspect, a computer program product having a series of operating instructions stored on a non-transitory computer-readable medium that directs a data processing apparatus when executed thereby to perform operations to predict a design BHP of a pump is disclosed. In one embodiment, the computer program product operations include: (1) selecting a design RPM of the pump, (2) computing an original K-R number using a viscosity of a fluid, and an original flow rate and a first BHP of the pump, wherein the computing is performed under controlled environmental conditions, (3) generating a normalized K-R number utilizing the original K-R number and a BEP K-R number, and a normalized flow rate utilizing the original flow rate and a BEP flow rate, wherein the BEP K-R number and the BEP flow rate are computed for the pump using water performance specifications, and (4) calculating the design BHP for the design RPM, wherein a BEP BHP is determined for the design RPM, and the design BHP is equal to ((the normalized flow rate^B*the BEP BHP)/the normalized K-R number), wherein B is equal to two when the viscosity is an absolute viscosity and B is equal to one when the viscosity is a kinematic viscosity.

BRIEF DESCRIPTION OF THE DRAWINGS

Reference is now made to the following descriptions taken in conjunction with the accompanying drawings, in which.

DETAILED DESCRIPTION

Figure 1:
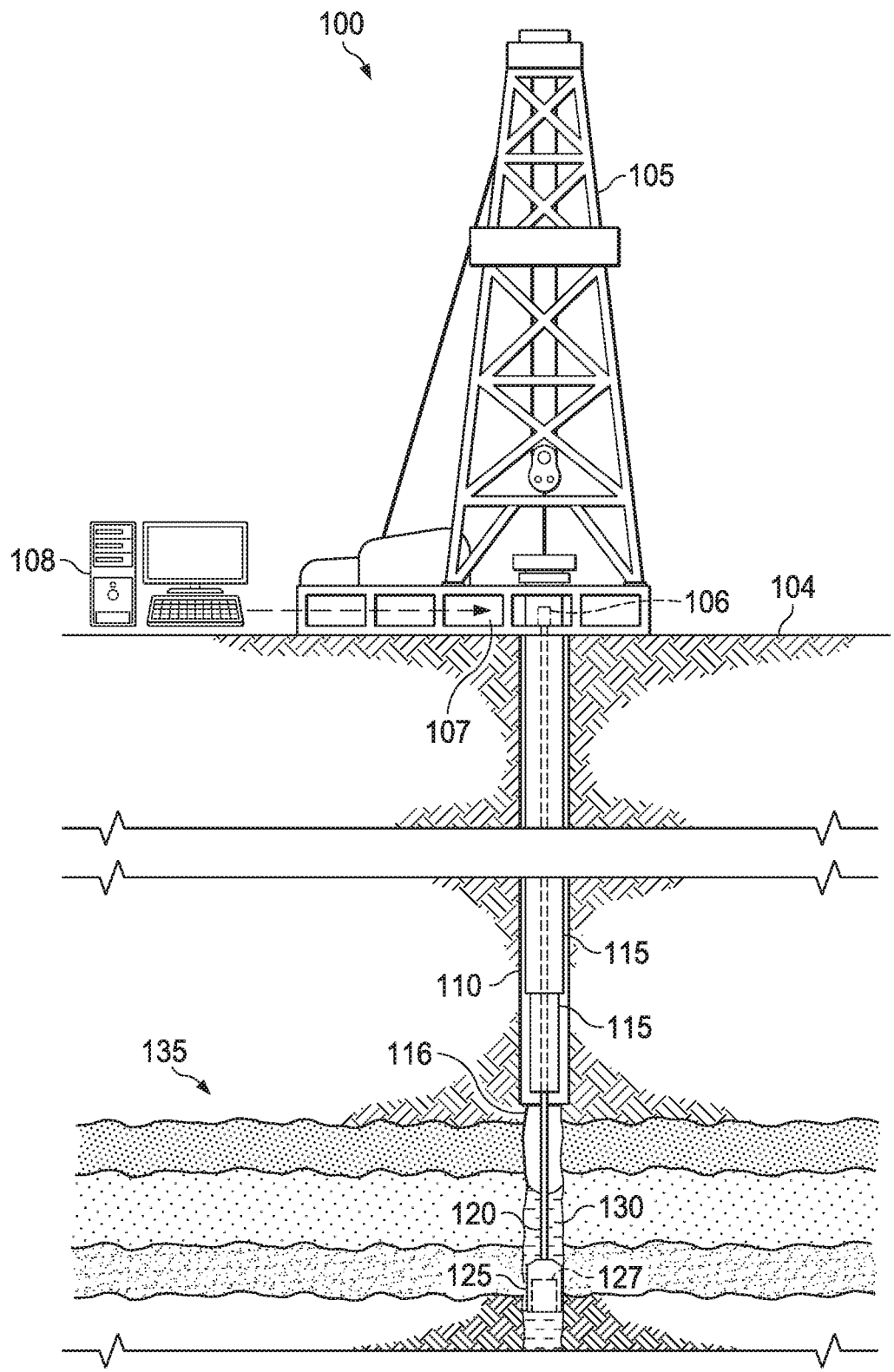
FIG. 1 is an illustration of a diagram of an example well system.

Pumps of various kinds can be utilized for pumping fluids in various industries and fields. For example, pumps can be centrifugal, rotary, displacement, metering, and other pump types. One type of pump, electrical submersible pumps (ESP), can be used to pump oil out of subterranean formations. An ESP is a multi-stage centrifugal pump having two or more stages, such as hundreds of stages, that can operate at variable speeds, e.g., from 1500 revolutions per minute (RPM) to 8000 RPM. The ESP operation can pump in or out a small amount of fluid, such as a few barrels per day (BPD) to hundreds of thousands of BPD.

Some types of pumps can also be utilized in non-subterranean formation applications such as in the medical field to pump blood or deliver medicine, in the chemical field, and in a broader hydrocarbon production field, for example, to pump mud, hydraulic fluid, brine, chemicals, oils, and other fluids into or out of a borehole. Selection of the pump, e.g., sizing the pump system, for one or more viscous applications include a selection of a stage type, stage diameter, flow rate, RPM range, a number of pump stages, seal (protector), motor, and optional components depending on the specific application, such as a gas separator.

Performance prediction of pumps in viscous applications, e.g., where the pumped fluid has a higher viscosity than water, especially in difficult environments such as an offshore application, requires higher accuracy than the accuracy provided by conventional prediction tools due to the cost of operating in the difficult environment. A discrepancy in the sizing and prediction of a pump type used an operating environment containing fluid of certain viscous properties can result in an increase in operating costs, such as in an offshore pumping operation where the increase can be several million dollars in additional time to pump the fluid or in additional maintenance costs.

For determining proper sizing of a pump for viscous applications, the pump's performance using various viscosities should be known. Generally, a pump having few stages can be built and tested in desired ranges of viscosities and RPMs in a test facility before the pump is sized and deployed in the actual application. The test results can be used for a prediction of the pump performance in the operating environment, such as an offshore production application. The prediction can be used to properly select the size of the pump and its motor before deployment. This building-testing-analyzing-modelling-predicting process can be costly and time-consuming, as well as inaccurate as viscosities and RPMs can vary widely based on the actual operating environment.

Introduced herein is a dimensionless relationship between a volumetric flow rate, a viscosity parameter, and a brake horsepower (BHP) that simplifies the prediction of horsepower (HP) requirements for a viscous pump performance. The estimated BHP, e.g., a preferred or design BHP, can be predicted from an analysis of the flow rate, head, speed (i.e., RPM), and viscosity of a pump derived from its water performance specifications. Water performance specifications are initially assumed to be at a viscosity of one centipoise (cP) and a temperature of 20 degrees Celsius. In aspects where the water has different specifications, the performance results can be normalized. The prediction of the BHP for a designed fluid viscosity can be derived from the water performance running at the same speed. The introduced relationship is referred through the disclosure as a Ketan-Robert (K-R) number and is derived in Equation 1 and Equation 2.

$$\text{Example } K\text{-}R \text{ number using} \qquad \text{Equation 1}$$
$$\text{absolute viscosity } K\text{-}R \text{ number} = \frac{Q^2}{BHP*\mu}$$

$$\text{Example } K\text{-}R \text{ number using} \qquad \text{Equation 2}$$
$$\text{kinematic viscosity } K\text{-}R \text{ number}$$
$$= \frac{Q*v^{0.5}}{RPM^{0.5}*BHP}$$

where Q is the mass flow rate of the viscous fluid;

BHP is the brake HP of the pump;

RPM is the rotational speed of the pump;

$\mu$ is the absolute viscosity; and v is the kinematic viscosity.

The kinematic viscosity and absolute viscosity are related through the conventional formula of $$v = \frac{\mu}{\text{fluid density}}.$$

In addition, Equations 1 and 2 can utilize a volumetric flow rate, where the volumetric flow rate is proportional to the mass flow rate using the fluid density, $$\text{volumetric flow rate} = \frac{Q}{\text{fluid density}}.$$

BHP is a function of the fluid flow rate, pump RPM, stage diameter of the pump, and hydraulic design of the pump. The flow rate is affected by the RPM, stage diameter, and hydraulic design of the pump. Equation 1 or Equation 2 can be utilized as the K-R number herein and the equation selected can be chosen for its ease of use, implementation need, available parameters, and other factors.

A best efficiency point (BEP) is where the pump has the highest efficiency in the pump performance specifications at the design RPM for a flow rate of water. Water performance specifications of a given pump is generally available from the pump's manufacturer and are provided in the form of a pump curve, which is drawn with respect to flow rate, head, BHP, and efficiency at an RPM (see FIG. 6 for an example BEP curve). For example, ESP industry water pump performance specifications of an ESP pump are published at 50 Hz (2917 RPM) or 60 Hz (3500 RPM) depending on the primary usage of the pump. In other aspects, the water performance specifications can be determined in a test environment, such as a lab or field experiment at a different RPM where the water performance specifications are adjusted using affinity laws. The lab or field tested results can be used in place of the published pump performance specifications.

The disclosure uses the K-R number to predict a recommended BHP for a pump. The K-R number is first calculated for one or more flow rates for a design RPM. Then the K-R number can be normalized by dividing it with the BEP K-R number. The K-R number of the viscous fluid, at the same RPM, is normalized against the K-R number at the BEP, see Equation 3. Similarly, the normalized flow rate can be calculated using the flow rate of the viscous fluid and the flow rate at the BEP, as shown in Equation 4. It is understood that flow rates other than the BEP flow rate, such as a near zero flow rate or near maximum flow rate or any other flow rate, can also be used for the normalization of the flow rates.

Example $K\text{-}R$ number normalization at a constant  Equation 3

$$RPM\ K\text{-}R\ number_{norm} = \frac{K - Rnumber_{viscous\ fluid}}{K - Rnumber_{BEP}}$$

Example flow rate normalization at a  Equation 4 constant $RPM rate_{norm} = \dfrac{flow\ rate_{viscous\ fluid}}{flow\ rate_{BEP}}$ Affinity laws can be utilized to transform the data from one RPM to another RPM for water performance, e.g., from the original or benchmark RPM to a specified or designed RPM. As the RPMs change, the K-R number for water performance also changes in an inverse proportional ratio, depending upon Equation 1 and 2. Typically, the K-R number for water performance at the BEP can be transformed to a different, e.g., designed, RPM using the inverse proportional ratio and the transformed K-R number can be utilized as the BEP K-R number for the designed RPM. Equation 5 demonstrates the inverse proportional ratio that can be used.

Example $K\text{-}R$ number for water performance with a  Equation 5 proportional $RPM$ change $BEPK\text{-}R\ number_{designRPM} =$ $$BEPK\text{-}R\ number_{origRPM} * \left(\frac{RPM_{orig}}{RPM_{design}}\right)^A$$

where BEP K-R number$_{orig\ RPM}$ is the BEP K-R number using the pump's BEP specifications;
$RPM_{orig}$ is the RPM used for the BEP specification;
$RPM_{design}$ is the newly specified, i.e., second or design, RPM that is used to transform the other values; and
A is 4 when using Equation 1 and A is 2.5 when using Equation 2.

In another aspect, affinity laws can be applied to calculate water performance of a pump at a designed RPM using its original RPM. The set of equations in Equation 6 show examples of the affinity laws.

Example affinity laws to  Equation 6 translate pump values to a design $RPM$ $$flowrate_{designRPM} = flowrate_{origRPM} * \left(\frac{RPM_{design}}{RPM_{orig}}\right)$$

$$head_{designRPM} = head_{origRPM} * \left(\frac{RPM_{design}}{RPM_{orig}}\right)^2$$

$$BHP_{designRPM} = BHP_{origRPM} * \left(\frac{RPM_{design}}{RPM_{orig}}\right)^3$$

Equation 5 and the set of equations in Equation 6 can be utilized for translating, e.g., transforming, pump specifications from one RPM to a second RPM using water as the fluid, prior to analyzing the system for another viscous fluid. These equations generally are not useful for calculation of pump performance at other RPMs using viscous fluids since the viscous losses follow a different relationship than the change in RPM alone would indicate. In hydrocarbon production applications, for example, oil, water, brine, gas, mud, sand, hydraulic fracturing fluid, and other fluids can mix in various proportions thereby affecting and continually changing the viscosity of the pumped fluid.

The disclosed process can follow the following steps to calculate a BHP of a selected pump for the design speed and design viscosity in the operating environment. (1) Computing a K-R number for the flow rates including BEP flow rate, using Equation 1 or 2 based on water performance at a pump's published specifications, e.g., parameters. The published, lab, and field determined specifications can be referred to as the benchmark specifications.

(2) The normalized K-R number and normalized flow rates for water performance are calculated by dividing each K-R number and flow rate with the respective BEP K-R number and flow rate, using Equation 3 and 4 respectively.

Figure 4A:
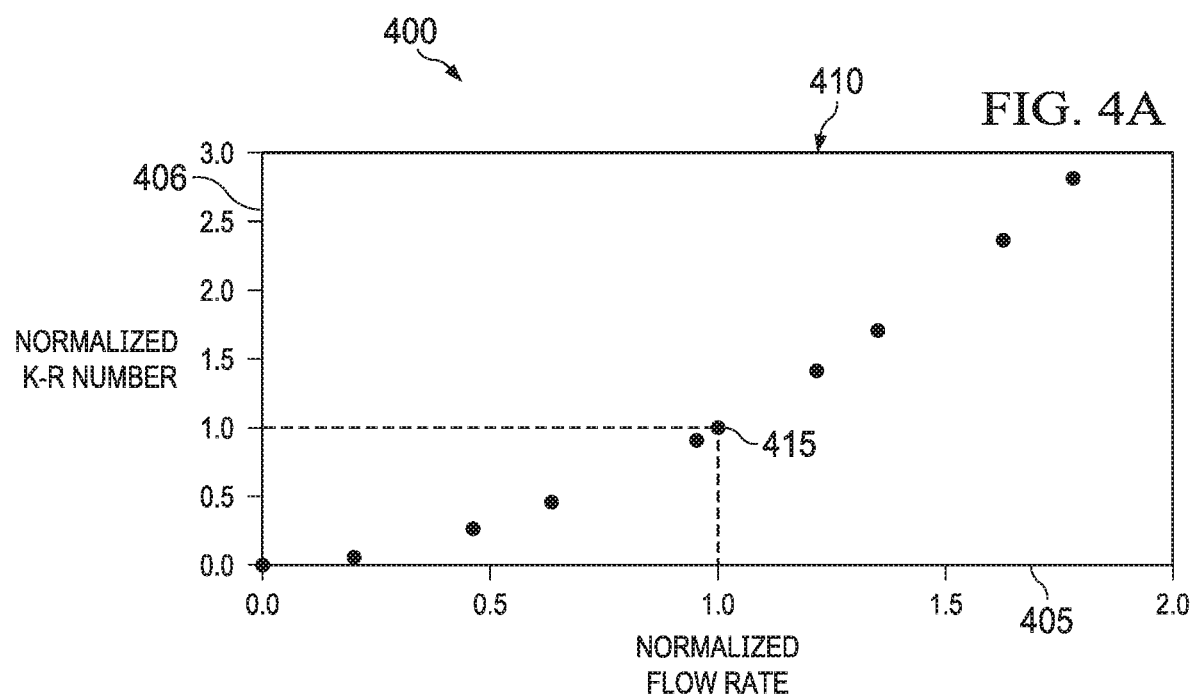
FIG. 4A is an illustration of a diagram of an example graph demonstrating a relationship between normalized flow rates and normalized Ketan-Roberts (K-R) numbers for a pump in water at a given rotations per minute (RPM) using absolute viscosity.
Figure 4B:
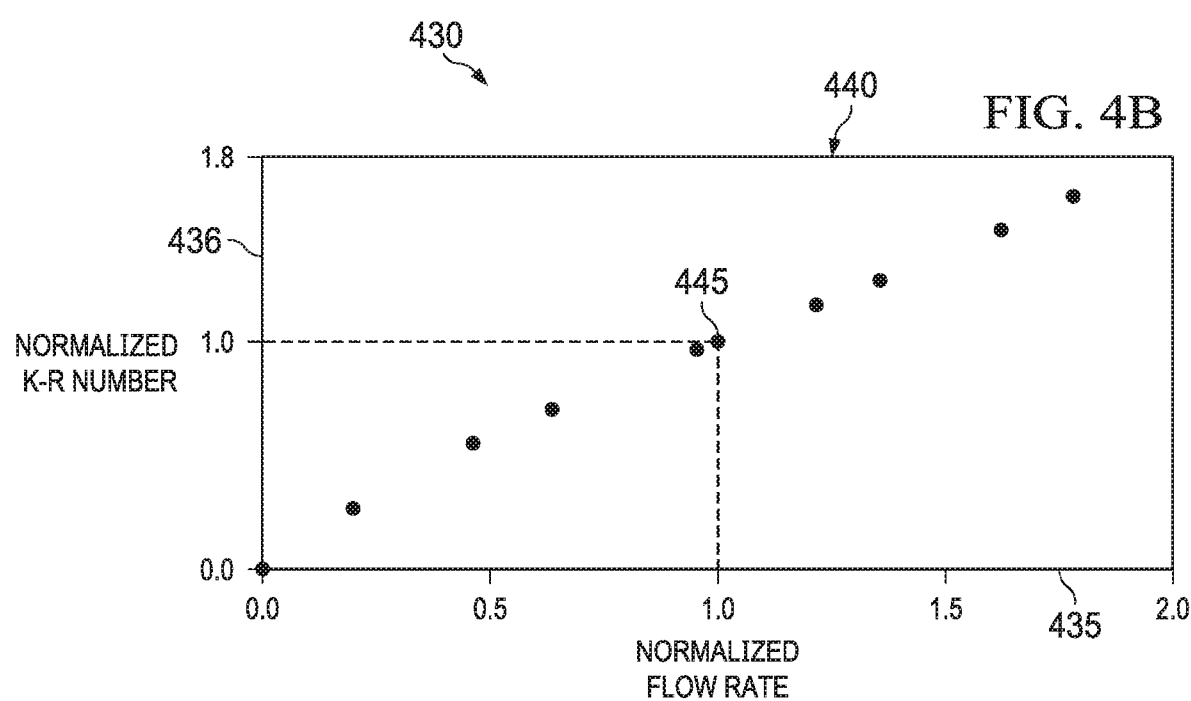
FIG. 4B is an illustration of a diagram of an example graph demonstrating a relationship between normalized flow rates and normalized K-R numbers for a pump in water using kinematic viscosity.
Figure 5A:
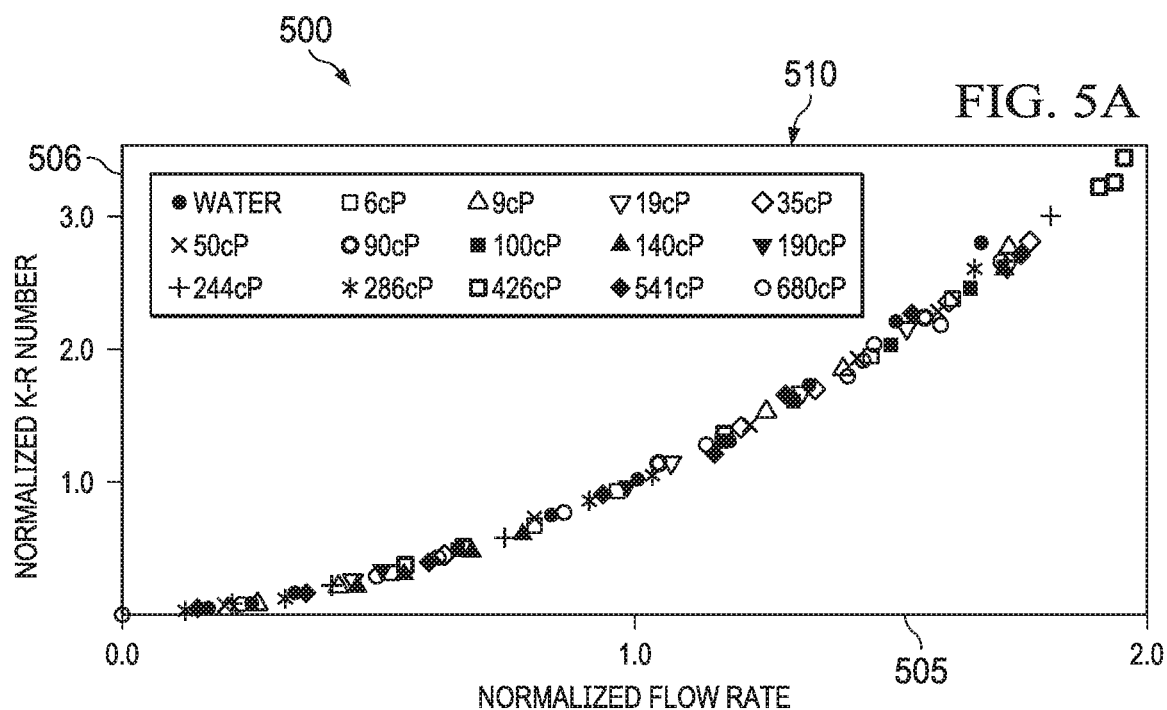
FIG. 5A is an illustration of a diagram of an example graph demonstrating a relationship between normalized flow rates and normalized K-R numbers for various viscous fluids using absolute viscosities.
Figure 5B:
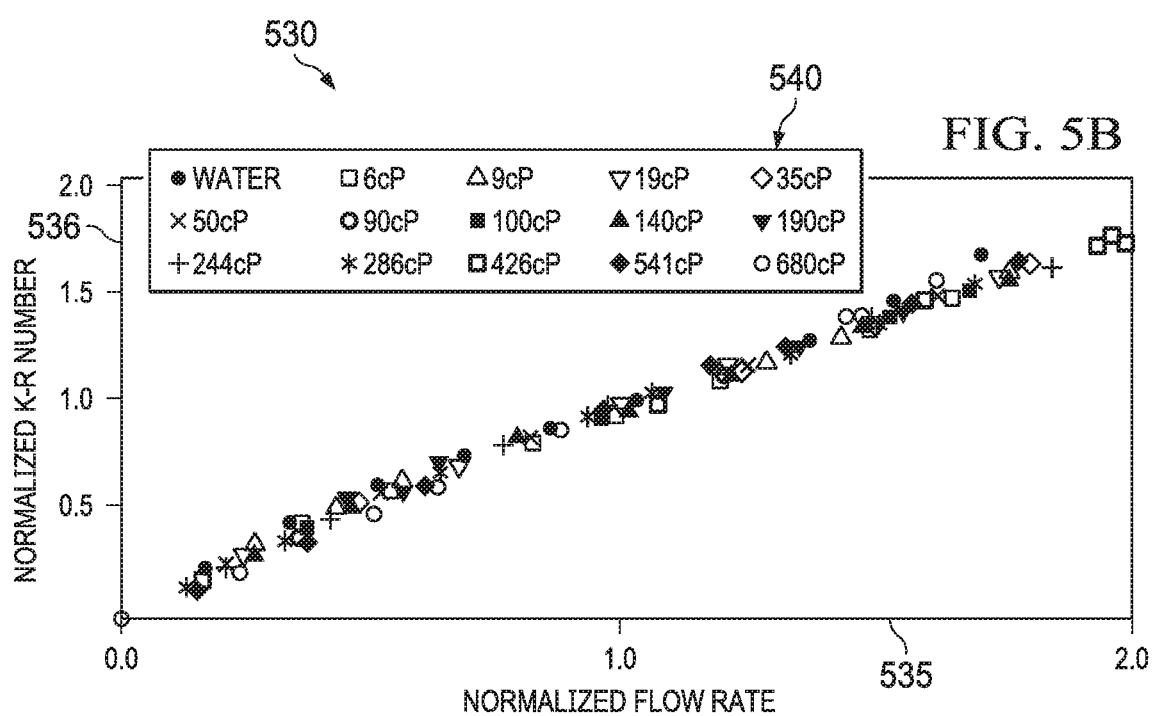
FIG. 5B an illustration of a diagram of an example graph demonstrating a relationship between normalized flow rates and normalized K-R numbers for various viscous fluids using kinematic viscosities.

(3) A relationship is developed between the normalized K-R number and the normalized flow rate for the water performance, for example, as shown in FIGS. 4A and 4B. This relationship is valid for all viscosities and RPMs, for example, as shown in FIGS. 5A and 5B.

(4) A pump is designed to operate in different conditions and RPMs than the water specifications. Utilizing the operating specifications at implementation for the pump, speed, viscosity, and flow rate can be selected, and can be referenced as the design speed, the design BHP, and the design flow rate. The design speed can be different than the benchmark RPM. Water performance specifications at the design RPM can be determined using affinity laws and the published water performance specifications.

(5) The BEP K-R number for water performance at the design RPM can be calculated using the RPM inverse proportional ratio, such as using Equation 5. In an alternative aspect, the BEP K-R number can be determined by calculating the water performance at the design speed using the affinity laws of Equation 6, deriving new pump performance specifications, and then calculating the K-R number using Equation 1 or 2.

(6) Other parameters for the water performance can be adjusted using the design RPM and the benchmark RPM, such as using the affinity laws in Equation 6.

(7) From the relationship of BEP ratios of the flow and BHP with viscosity and speed, the design BEP flow rate and design BEP BHP is obtained from the BEP water performance parameters at the design RPM.

(8) The design flow rate can be normalized against the design BEP flow rate at design RPM and viscosity, such as using Equation 4.

(9) A normalized K-R number at the normalized flow rate can be computed, such demonstrated in FIG. 5A or 5B.

(10) A BHP for the design viscous fluid and design RPM can be calculated. Equation 7 and Equation 8 are examples of calculating the predicted BHP.

Example prediction calculation of a $BHP$ using Equation 1  Equation 7

$BHP_{design\ RPM,\ viscosity} =$ $$\frac{flow\ rate_{normalized\ at\ design\ RPM,viscosity}^2 * BHP_{BEP,design\ RPM,viscosity}}{K\text{-}R_{normalized\ at\ design\ RPM,viscosity}}$$

Example prediction calculation of a $BHP$ using Equation 2  Equation 8

$BHP_{design\ RPM,\ viscosity} =$ $$\frac{flow\ rate_{normalized\ at\ design\ RPM,viscosity}^2 * BHP_{BEP,design\ RPM,viscosity}}{K\text{-}R_{normalized\ at\ design\ RPM,viscosity}}$$

where flow rate is the normalized flow rate derived from the pump's specifications or the flow rate as adjusted by a change in RPM selection;

BHP is the BHP at the BEP as derived from the pump's specifications, or the BHP as adjusted by a change in RPM selection; and $K\text{-}R_{normalized}$ is the calculated K-R number, or the K-R number as adjusted by a change in RPM selection.

To demonstrate the process, an example pump and environment scenario is presented. In step 1, the pump performance characteristics are determined, such as from published materials and the expected operating environment as shown in Table 1.

TABLE 1

Example pump water performance characteristics

| Stage | SJ2800 |
|---|---|
| Speed | 2333 RPM |
| Flow | 700 BPD |
| Viscosity | 300 cP |

Steps 2 and 3 are performed to develop a K-R number for the viscous BHP correlation (see, for example, Equations 1 and 2, and FIGS. 4A and 4B). Steps 4 and 5 are performed to calculate the BEP water performance at the design (operating environment) RPM that was identified in step 1 as shown in Table 2, such as using affinity laws (see, for example, Equations 5 and 6).

TABLE 2

Example BEP calculations

| | | 40 Hz BEP water data 2333 RPM | 60 Hz BEP water data 3500 RPM |
|---|---|---|---|
| water | BEP flow rate | 1974 BPD | 2961 BPD |
| water | BEP Head | 24.88 feet | 56.00 feet |
| water | BEP BHP | 0.531 HP | 1.793 HP |

Step 7 can be utilized to calculate the BEP flow rate, head design at the design viscosity and design speed using the BEP and speed relationship, as shown in Table 3.

TABLE 3

Example BEP calculations

| | 40 Hz BEP water data 2333 RPM | Correction Factor for 2333 RPM & 300 cP | 40 Hz BEP 300 cP data 2333 RPM |
|---|---|---|---|
| BEP flow rate | 1974 BPD | (X) 0.4678 | 923.232 BPD |
| BEP Head | 24.88 feet | (X) 0.7112 | 17.6961 feet |
| BEP BHP | 0.531 HP | (X) 2.2198 | 1.1788 HP |

Step 8 is performed to calculate the normalized flow rate at the design RPM and design viscosity as shown in Table 4 (see, for example, Equation 4).

TABLE 4

Example normalized flow rate

| | Original flow rate | Normalized flow rate |
|---|---|---|
| Normalized flow at design RPM, viscosity (divide by 923.232, such as using Equation 4) | 700 | =0.7582 |

Step 9 is performed to calculate the normalized K-R number using the relationships developed in Step 3 as shown in Table 5 (see, for example, Equation 3).

TABLE 5

Example K-R number normalization

| | Normalized flow rate | Normalized K-R number |
|---|---|---|
| Normalized K-R number at design RPM, viscosity (Using equation 2, FIGS. 4B and 5B) | 0.7582 | 0.8152 |

Step 10 is performed to calculate the design BHP as shown in Table 6 (see, for example, Equations 7 and 8).

TABLE 6

Example BHP calculation

| Design BHP = (using equation 2 and 8) | 0.7582 * 1.1788/0.8152 | =1.0964 BHP |
|---|---|---|

Once the predicted BHP is calculated, the information can be provided to a user, such as an engineer or operator. The user can utilize the information, combined with other parameters, data, factors, and information, in selecting and sizing the pump and determining the appropriate number of pump stages for the implementation. Some considerations the user can utilize in the pump selection analysis can be to maximize efficiency, minimize maintenance requirements, pump cost, pump operation cost, and other factors.

Turning now to the figures, FIG. 1 is an illustration of a diagram of an example well system 100, for example, an extraction system, a production system, a wireline system with a pump, and other hydrocarbon well systems. Well system 100 includes a derrick 105, a well site controller 107, a surface pump system 106, and a computing system 108. Well site controller 107 includes a processor and a memory and is configured to direct operation of well system 100. Derrick 105 is located at a surface 104.

Extending below derrick 105 is a borehole 110, with two cased sections 115 and one uncased section 116. Pipe 120 is inserted in borehole 110. Located at the bottom of pipe 120 is a downhole tool 125. Downhole tool 125 can include various downhole tools and bottom hole assemblies (BHA), such as one or more pumps 127 and valves. Other components of downhole tool 125 can be present, such as a local power supply, or batteries and capacitors to store power received from another system, as well as a transceiver and a control system. Borehole 110 is surrounded by subterranean formation 135. Connecting surface pump system 106 and downhole tool 125 is the pipe 120. Surface pump system 106 and pumps 127 can be sized using the processes described herein.

In this example, pumps 127 can have one or more stages to pump fluid 130 into or out of borehole 110. Pumps 127 selected to be part of downhole tool 125 should be sized appropriately for the type of fluid and the viscosity of the fluid to be pumped. An inefficient pump could result in significant financial loss in terms of time used to pump the fluid, or a loss in time in replacing the pumps with ones of different specifications.

Computing system 108 or well site controller 107 can be utilized to perform the calculations and computations as described herein to predict an appropriate BHP which can be used to select and size pumps 127 to be used within borehole 110 as part. Computing system 108 can be proximate well site controller 107 or be a distance away, such as in a cloud environment, a data center, a lab, or a corporate office. Computing system 108 can be a laptop, smartphone, PDA, server, desktop computer, cloud computing system, and other computing systems that are operable to perform the process and methods described herein. The information generated from computing system 108 can be communicated by various conventional means to the well site operators and engineers so the predicted BHP can be used in selecting the pumps to be used in well system 100.

Figure 2:
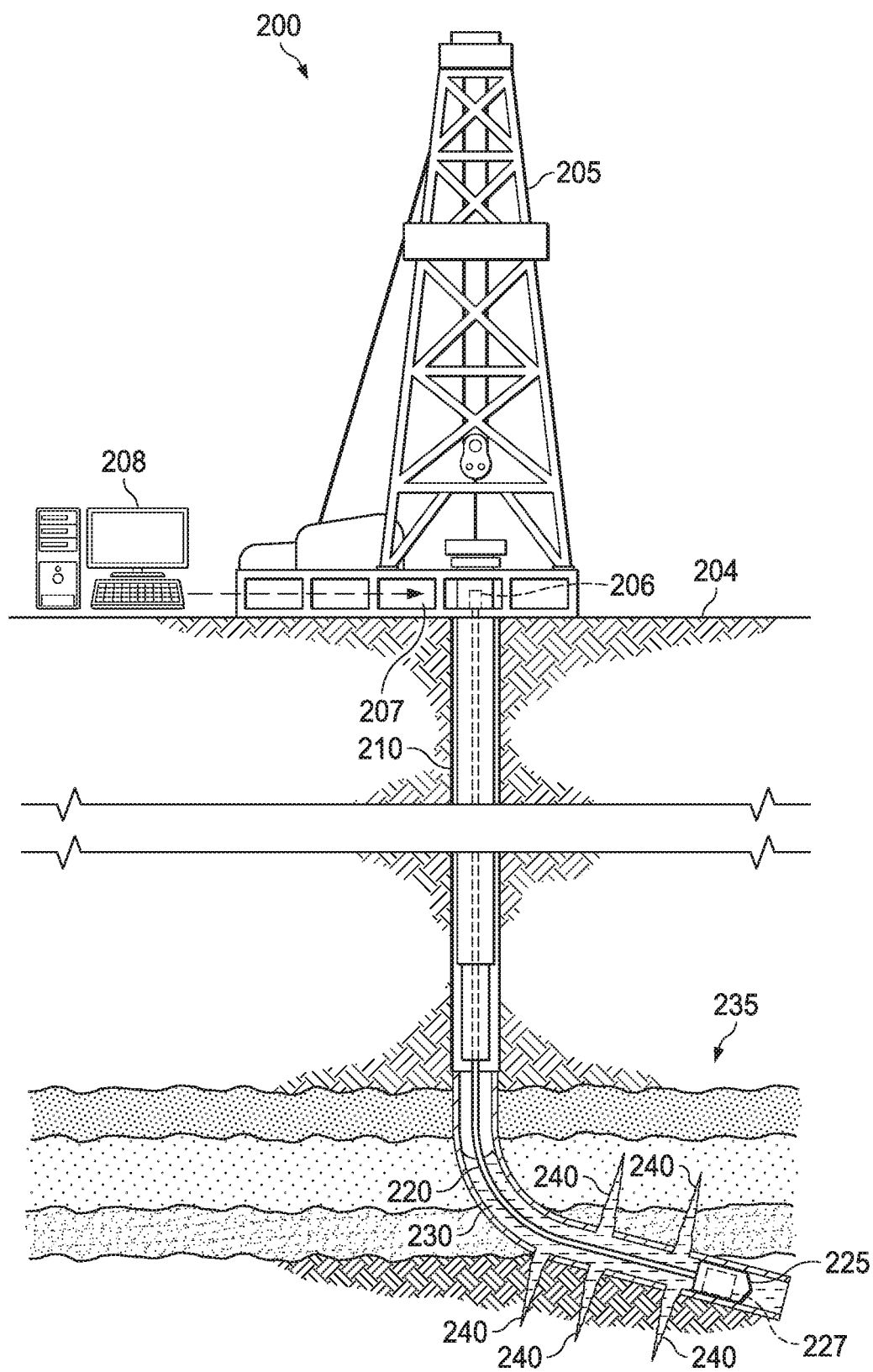
FIG. 2 is an illustration of a diagram of an example pump system in a hydraulic fracturing well system.

FIG. 2 is an illustration of a diagram of an example pump system in a hydraulic fracturing (HF) well system 200, which can be a well site where HF operations are occurring through the implementation of a HF treatment stage plan. HF well system 200 demonstrates a nearly horizontal wellbore undergoing a fracturing operation.

HF well system 200 includes a surface well equipment 205 located at a surface 204, a well site control equipment 207, a surface HF pump system 206, and a computing system 208. In some aspects, well site control equipment 207 is communicatively connected to separate computing system 208, for example, a separate server, data center, cloud service, tablet, laptop, smartphone, or other types of computing systems capable of executing the processes and methods described herein. Computing system 208 can be located proximate to well site control equipment 207 or located a distance from well site control equipment 207, and can be utilized by a well system engineer and operator to calculate the predicted BHP for a pump, such as pumps 227, to be used within HF well system 200.

Extending below surface 104 from surface well equipment 205 is a wellbore 210. Wellbore 210 can have zero or more cased sections and a bottom section that is uncased. Inserted into wellbore 210 is a fluid pipe 220. The bottom portion of fluid pipe 220 has the capability of releasing downhole material 230, such as carrier fluid with diverter material, from fluid pipe 220 to subterranean formations 235 containing fractures 240. The release of downhole material 230 can be by perforations in fluid pipe 220, by valves placed along fluid pipe 220, or by other release means. At the end of fluid pipe 220 is an end of pipe assembly 225, which can be one or more downhole tools or an end cap assembly. End of pipe assembly 225 can include pumps 227 to pump fluid into or out of wellbore 210.

In an alternative aspect, downhole material 230 can be pumped to the surface, such as removing HF fluid or removing hydrocarbon fluids. The fluid can be pumped through fluid pipe 220 using surface HF pump system 206, pumps 227, or a combination thereof. In some aspects, the computing system 208 and the well site control equipment 207 can be used to calculate the predicted BHP for the pumps used within HF well system 200. The predicted BHP can be used as part of the analysis to select pumps for use within HF well system 200.

Figure 3:
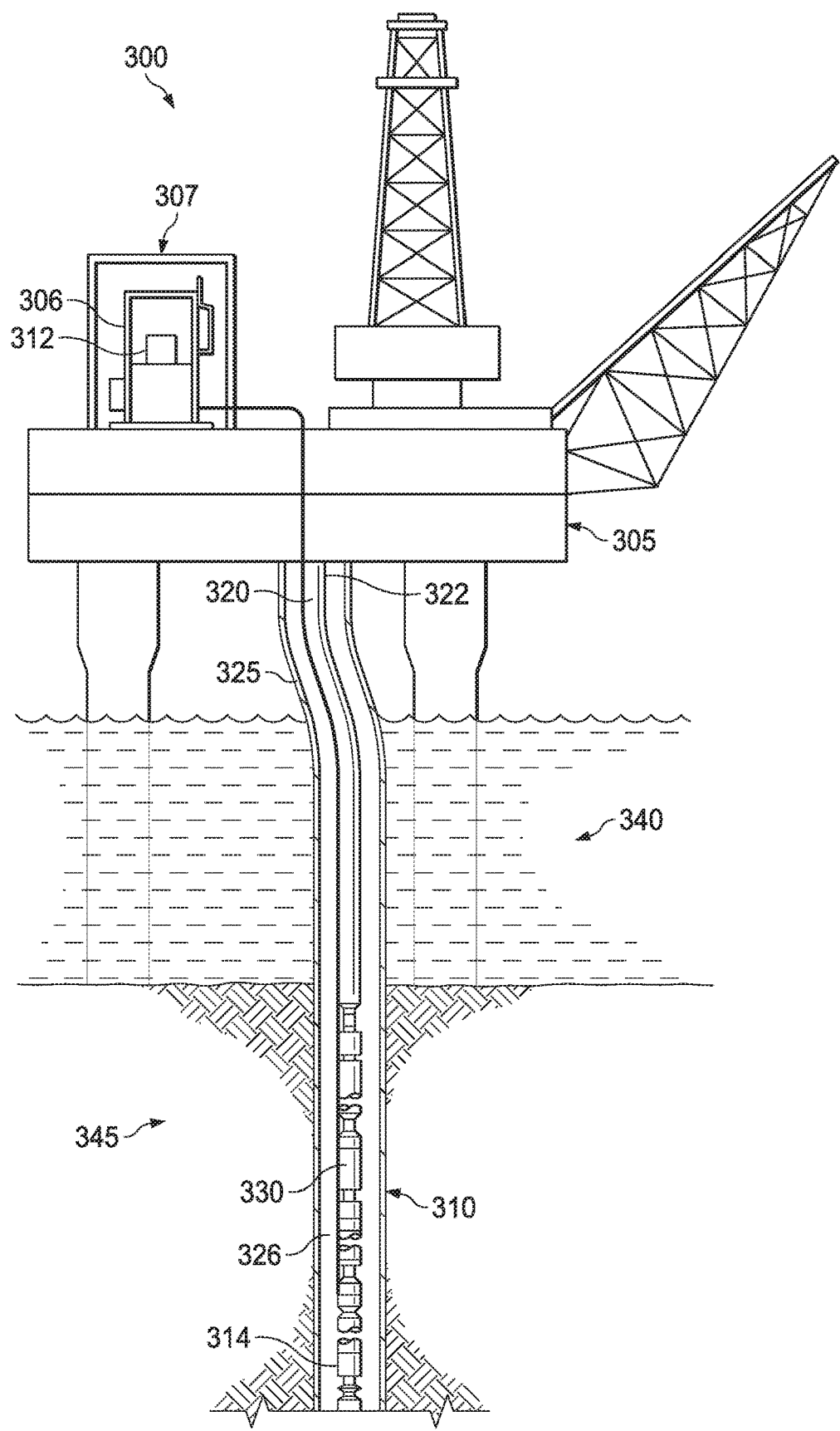
FIG. 3 is an illustration of a diagram of an example pump system in an offshore well system.

FIG. 3 is an illustration of a diagram of an example pump system in an offshore well system 300, where an ESP assembly 310 is placed downhole in a borehole 326 below a body of water 340, such as an ocean or sea. Borehole 326 is surrounded by subterranean formation 345. ESP assembly 310 can also be used for onshore operations. The ESP assembly 310 includes a speed controller 312, an ESP motor 314, and an ESP pump 330.

Speed controller 312 is placed in a cabinet 306 inside a control room 307 on an offshore platform 305, such as an oil rig. Speed controller 312 is configured to adjust the RPM of ESP motor 314 to improve well productivity. In the illustrated embodiment, ESP motor 314 is a two-pole, three-phase squirrel cage induction motor that operates to turn ESP pump 330. ESP motor 314 is located near the bottom of ESP assembly 310, just above downhole sensors within borehole 326. A power cable 320 extends from speed controller 312 to ESP motor 314.

ESP pump 330 can be a multi-stage centrifugal pump including an impeller and a diffuser at each stage. Before the deployment, the performance of ESP pump 330 is predicted using a viscous BHP prediction method, such as a method 701 in FIG. 7A, by a computer system, such as BHP predictor system 800 in FIG. 8. Based on the prediction, ESP pump 330 can be sized for the implementation application of offshore well system 300. ESP pump 330 should be sized and selected to enable efficient pumping of fluid of interest, such as oil or other hydrocarbons, through production tubing 322 to storage tanks onboard the offshore platform 305.

In some embodiments, ESP pump 330 can be a horizontal surface pump, a progressive cavity pump or an electric submersible progressive cavity pump. A motor seal section and intake section may extend between ESP motor 314 and ESP pump 330. A well casing 325 may separate ESP assembly 310 from water 340 and subterranean formation 345. Perforations in well casing 325 can allow the fluid of interest from subterranean formation 345 to enter borehole 326.

FIGS. 1 and 2 depict onshore operations. Those skilled in the art will understand that the disclosure is equally well suited for use in offshore operations. FIGS. 1, 2, and 3 depict specific borehole configurations, those skilled in the art will understand that the disclosure is equally well suited for use in boreholes having other orientations including vertical boreholes, horizontal boreholes, slanted boreholes, multilateral boreholes, and other borehole types.

FIG. 4A is an illustration of a diagram of an example graph 400 demonstrating a relationship between normalized flow rates and normalized K-R numbers for a pump in water at a given RPM using absolute viscosity as shown in Equation 1. The points shown in plot area 410 varies with a change in a pump design and is also a function of the pump specific design parameters. The points of plot area 410 can be used for a prediction of a BHP of the pump at a different RPM and in different fluid.

X-axis 405 shows the normalized flow rate determined using the water performance specifications of the pump. Flow rates from the water performance specifications are normalized using a flow rate at a reference point, e.g., BEP, for the given RPM. For the normalization, each of the flow rates can be divided by the BEP flow rate.

Y-axis 406 shows the normalized K-R numbers determined using the water performance specifications of the pump. Using Equation 1, the flow rates, and other parameters from the water performance specifications, K-R numbers can be calculated. This is shown as point 415 where the BEP flow rate and BEP K-R number are both one. The calculated K-R number for the viscous fluid are then normalized using the above K-R number and flow rate at the BEP.

FIG. 4B is an illustration of a diagram of an example graph 430 demonstrating a relationship between normalized flow rates and normalized K-R numbers for a pump in water at a given RPM using kinematic viscosity as shown in Equation 2. The points shown in plot area 440 varies with a change in a pump design and is also a function of the pump specific design parameters. The points of plot area 440 can be used for a prediction of a BHP of the pump at a different RPM and in different fluid.

X-axis 435 shows the normalized flow rate determined using the water performance specifications of the pump. Flow rates from the water performance specifications are normalized using a flow rate at a reference point, e.g., BEP, for the given RPM. For the normalization, each of the flow rates can be divided by the BEP flow rate.

Y-axis 436 shows the normalized K-R numbers determined using the water performance specifications of the pump. Using Equation 2, the flow rates, and other parameters from the water performance specifications, K-R numbers can be calculated. This is shown as point 445 where the BEP flow rate and BEP K-R number are both one. The calculated K-R number for the viscous fluid are then normalized using the above K-R number and flow rate at the BEP.

FIG. 5A is an illustration of a diagram of an example graph 500 demonstrating a relationship between normalized flow rates and normalized K-R numbers for various viscous fluids using absolute viscosities, as shown in Equation 1. X-axis 505 shows the normalized flow rates for the various viscous fluids. Y-axis 506 shows the corresponding normalized K-R numbers for the viscous fluids. Unlike graph 400 in FIG. 4A, graph 500 are for fluids other than water. Plot area 510 shows data points for several different fluid viscosities.

The fluids include first fluid having 6 cP viscosity (hollow square), second fluid having 9 cP viscosity (hollow triangle), third fluid having 19 cP (solid rectangle), fourth fluid having a 35 cP (hollow diamond), fifth fluid having a 50 cP (X), sixth fluid having 90 cP (hollow circle), seventh fluid having a 100 cP (solid square), eighth fluid having 140 cP (solid triangle), ninth fluid having 190 cP (circle with square inside), tenth fluid having 244 cP (+), eleventh fluid having 285 cP (circle with angled lines), twelfth fluid having 426 cP (circle with intersecting lines), thirteenth fluid having 541 cP (X with a shaded background), and fourteenth fluid having 680 cP (gray circle).

As shown, while the fluids and their viscosities differ, the viscous performance correlation, i.e., the relationship between the normalized flow rates to the corresponding normalized K-R numbers, remains approximately equivalent. As such, a K-R number correlation of a pump in water at a given RPM, e.g., graph 400 and graph 500 in FIGS. 4A and 5A respectively, can be used in predicting a BHP of the pump in a viscous application, such as fluids of various viscosities in downhole operations.

FIG. 5B is an illustration of a diagram of an example graph 530 demonstrating a relationship between normalized flow rates and normalized K-R numbers for various viscous fluids using kinematic viscosities, as shown in Equation 2. X-axis 535 shows the normalized flow rates for the various viscous fluids. Y-axis 536 shows the corresponding normalized K-R numbers for the viscous fluids. Unlike the graph 430 in FIG. 4B, graph 530 are for fluids other than water. Plot area 540 shows data points for several different fluid viscosities.

The fluids include first fluid having 6 cP viscosity (hollow square), second fluid having 9 cP viscosity (hollow triangle), third fluid having 19 cP (solid rectangle), fourth fluid having a 35 cP (hollow diamond), fifth fluid having a 50 cP (X), sixth fluid having 90 cP (hollow circle), seventh fluid having a 100 cP (solid square), eighth fluid having 140 cP (solid triangle), ninth fluid having 190 cP (circle with squares inside), tenth fluid having 244 cP (+), eleventh fluid having 286 cP (circle with angled lines), twelfth fluid having 426 cP (circle with intersecting lines), thirteenth fluid having 541 cP (X with a shaded background), and fourteenth fluid having 680 cP (gray circle).

As shown, while the fluids and their viscosities differ, the viscous performance correlation, i.e., the relationship between the normalized flow rates to the corresponding normalized K-R numbers, remains approximately equivalent. As such, a K-R number correlation of a pump in water at a given RPM, e.g., graph 430 and graph 530 in FIGS. 4B and 5B respectively, can be used in predicting a BHP of the pump in a viscous application, such as fluids of various viscosities in downhole operations.

Figure 6:
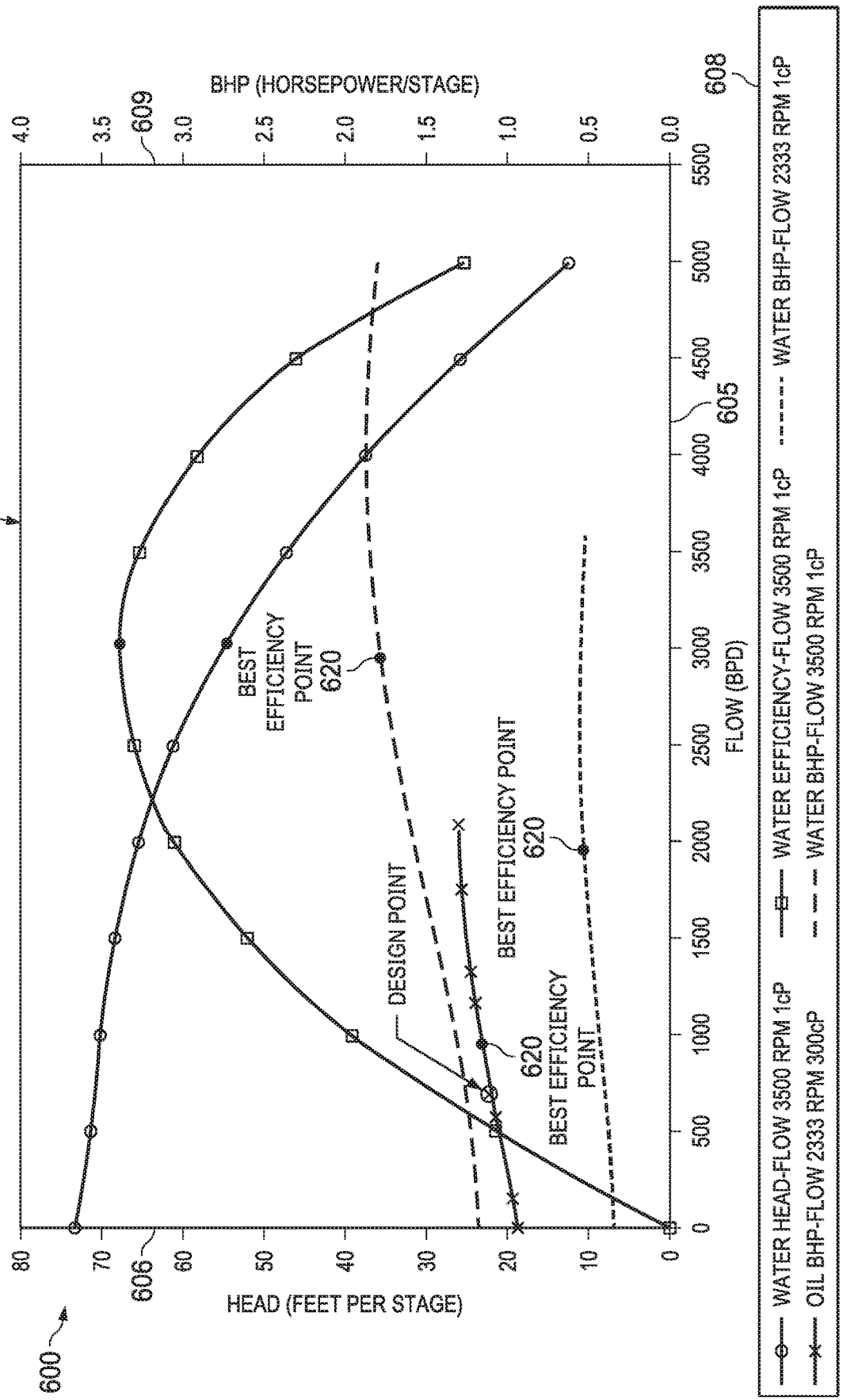
FIG. 6 is an illustration of a diagram of an example graph demonstrating performance curves of an exemplary pump.

FIG. 6 is an illustration of a diagram of an example graph 600 demonstrating performance curves of an exemplary pump. Performance specifications, such as graph 600, can be made available to a user of the exemplary pump and used to identify BEPs under various operating scenarios. Graph 600 has an x-axis 605 showing the flow rate in BPD, a primary y-axis 606 showing the head in feet per stage, a secondary y-axis 609 showing the BHP, e.g., horsepower per stage, and a graph key 608 showing different sample fluid viscosities at differing RPMs that are plotted in plot area 610.

The exemplary pump operating characteristics are for water at room temperature, atmospheric pressure with specific gravity of 1.00 and viscosity of one cP. For the fixed speed as specified in graph key 608, variations of head (e.g., pressure) and BHP with respect to change in flow rates are plotted. The performance characteristics also demonstrate an efficiency relationship with the flow rate demonstrating the optimal performance of the pump at the BEP, and demonstrating the operating range for optimal and reliable operation of the pump to maximize pump runlife.

BEP 620 shows the BEP points for some of the plotted performance curves. BEP 620 can be used to provide data inputs, i.e., pump characteristics or specifications, such as flow rates, to the equations used herein. The initial K-R number can be computed using the specifications at one of the data points of BEP 620, depending on the viscosity and RPM selected.

Figure 7A:
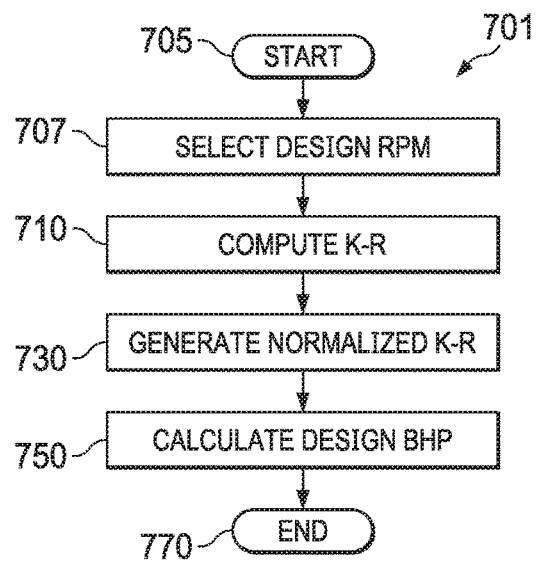
FIG. 7A is an illustration of a flow diagram of an example method to predict a brake horsepower (BHP) of a pump for a viscous fluid.

FIG. 7A is an illustration of a flow diagram of an example method 701 to predict BHP of a pump for a viscous fluid. Method 701 can utilize pump specifications determined in a lab, a field test, or published by the pump's manufacturer to perform calculations to predict an appropriate BHP for a pump for a specific implementation. Method 701 can be executed by a computing system, such as BHP predictor system 800 in FIG. 8. Method 700 starts at a step 705 and proceeds to a step 707.

In step 707, a design RPM can be selected. The design RPM can be the same as what was used in the published, lab, or field-tested specifications, e.g., benchmark specifications, for the pump. If the design RPM is different than the benchmark RPM, then algorithms can be applied, such as affinity laws, to transform various parameters from the benchmark RPM to the design RPM.

In step 710, the K-R number for the BEP point can be computed for a design RPM. The viscosity can be assumed to be one for water. The parameters used for the computations can be received, such as receiving manufacturer's pump specifications or receiving specifications derived in lab or field testing. In addition, user inputs can be received, such as receiving a design RPM, flow rate, and other user design parameters. The various inputs can be entered by a user, received via an electronic communication, received from a memory or computing storage location, or a combination thereof. In other aspects, testing using other fluids can be used to determine the BEP point and that fluid's viscosity and pump specifications would be utilized. A second K-R number for the specific implementation can be computed, such as using Equation 1 or Equation 2. The specific implementation may have a different RPM, flow rate, or other parameter as compared to the original specifications used to determine the BEP specifications. The RPM and flow rate are data inputs, as well as the viscosity of the fluid.

In step 730, the second K-R number is generated by normalizing the original K-R number using the BEP K-R number, such as using Equation 3. In addition, the normalized flow rate is generated using the original flow rate of the BEP, such as using Equation 4. In a step 750, the design BHP is calculated using the normalized flow rate and the normalized K-R number, such as using Equation 7Method 701 ends at a step 770.

Figure 7B:
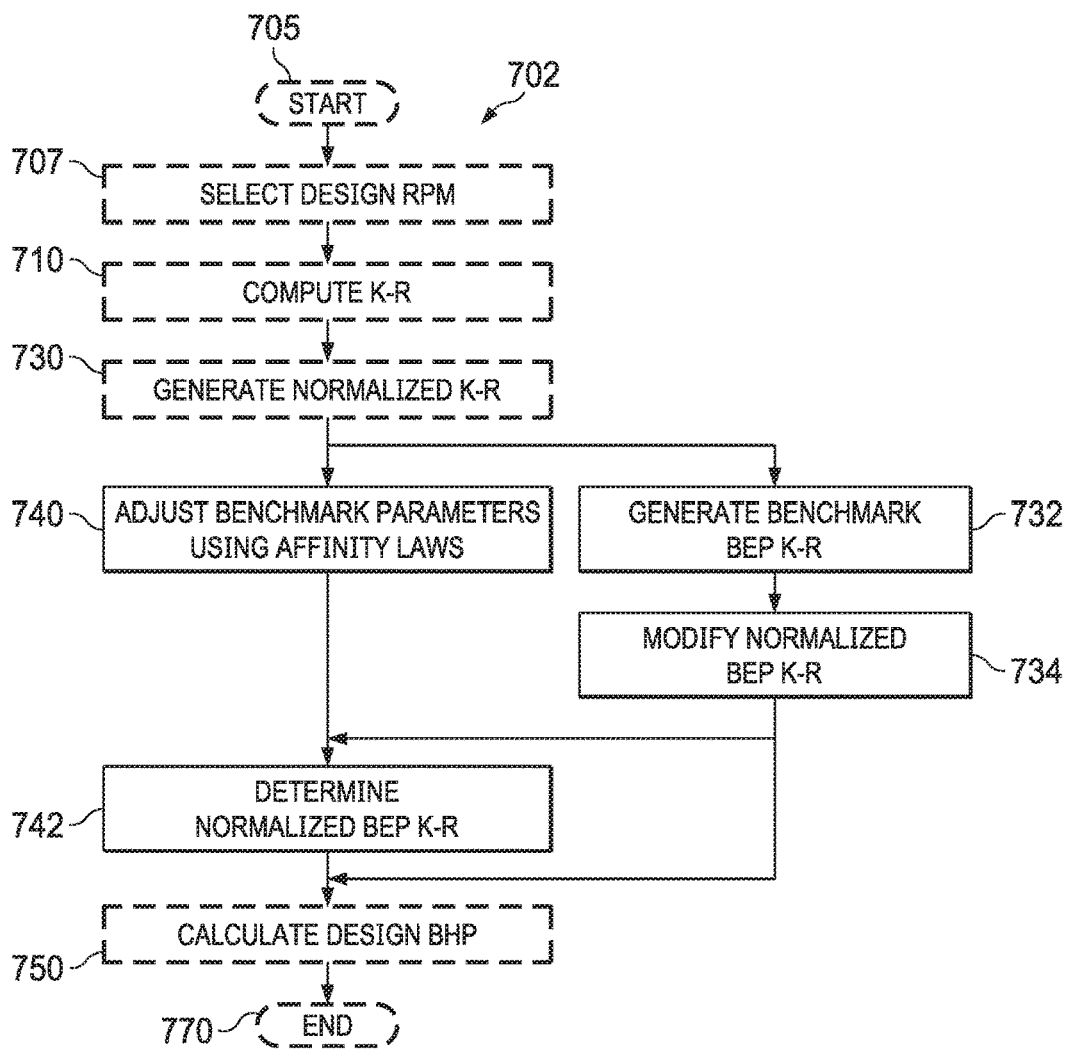
FIG. 7B is an illustration of a flow diagram of an example method, building on FIG. 7A, to normalize best efficiency point K-R numbers.

FIG. 7B is an illustration of a flow diagram of an example method 702, building on FIG. 7A, to normalize BEP K-R numbers. Method 702 incorporates the steps of method 700 and includes additional sub-steps. Method 701 can be executed by a computing system, such as BHP predictor system 800 in FIG. 8. Method 702 starts at step 705 and proceeds through step 707 and step 710 to step 730. Step 730 includes two potential sub-steps that can be performed depending on the analysis being conducted and the parameters that are available. Method 702 can proceed to a step 732 or a step 740, or both step 732 and step 740.

Step 732 can generate a benchmark BEP K-R number. The benchmark K-R number can be the same as or modified from a tested or published set of pump specifications, such as to a design RPM. The transforming of the benchmark K-R number can allow pump operators to adjust the RPM, utilizing other factors, while being able to continue to predict a design BHP for the current operation plan. In a step 734, the benchmark BEP K-R number can be normalized using the variation in pump RPM, such as using Equation 5. Method 700 can proceed to step 740 or to step 750.

Step 740 can adjust the benchmark parameters using affinity laws or the set of equations in Equation 6. The flow rate, the head, and the BHP (such as the BEP BHP) can be adjusted using conventional affinity laws, for example, as shown in Equation 6. In a step 742, the adjusted benchmark parameters can be normalized against the BEP parameters, such as the BEP K-R number and the BEP flow rate. These adjusted benchmark parameters can then be further used to perform the calculations to determine the design BHP for the viscous fluid. Method 702 proceeds to step 732 or to step 750. Method 702 ends at step 770.

Figure 8:
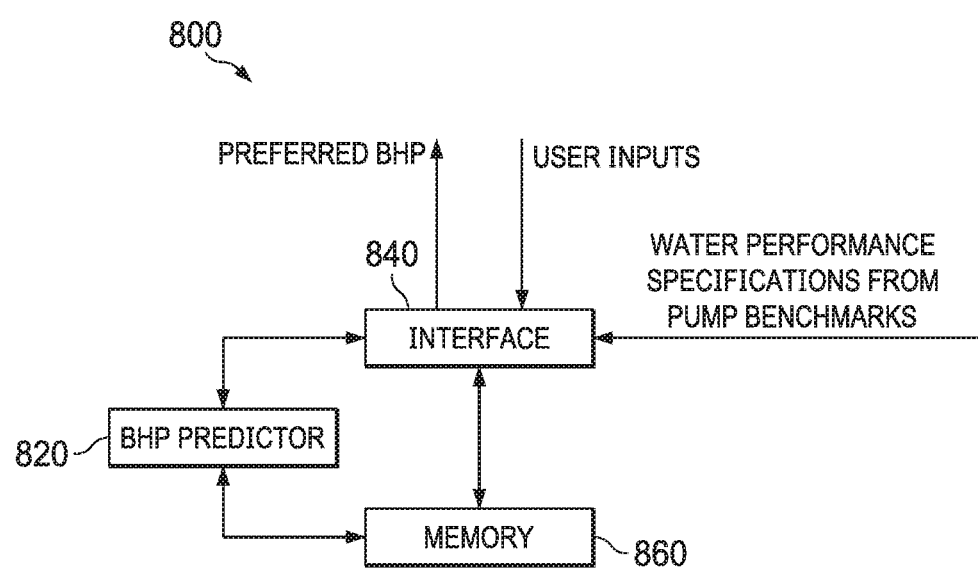
FIG. 8 is an illustration of a block diagram of an example BHP predictor system.

FIG. 8 is an illustration of a block diagram of an example BHP predictor system 800 that has been constructed and configured to perform a BHP prediction method, such as method 701 and method 702. BHP predictor system 800 includes a BHP predictor 820, an interface 840 and a memory 860. It is understood that the BHP predictor system 800 has been simplified for illustration purposes and may not illustrate some of the components that may be present in an actual system.

BHP predictor 820 can be one or more of a processing unit such as a central processing unit, a graphics processing unit, and other types of processing units, that are configured to predict a BHP of a given pump in a fluid of interest at a design RPM. BHP predictor 820 can be communicatively coupled to interface 840 and to memory 860.

Interface 840 can be a user interface, a network interface, or a communications interface that is configured to receive water performance specifications of the given pump, such as benchmark, lab tested, field tested, and published specifications, and a design RPM and other user inputs. Interface 840 can output a design BHP for the pump for various viscosities fluid. In some aspects, a well system analyzer can be configured to receive the design BHP, and other parameters and specifications, and perform analysis to determine sizing and specifications for the pumps to be used in the implementation. Interface 840 can be a transceiver communications interface that is configured to communicate data, i.e., transmit and receive data. Interface 840 can include the logic, ports, terminals, and connectors to communicate data. The ports, terminals, connectors, may be conventional receptacles for communicating data via a communications network.

Memory 860 can be a computer memory such as cache, a read-only memory (ROM), a programmable ROM (PROM), an erasable PROM, a dynamic random-access memory (DRAM), a static random-access memory, and a flash memory. Memory 860 can be configured to store the received water performance specifications of the given pump and other calculated performance specifications from BHP predictor 820. Memory 860 can also be configured to store computer executable instructions to direct the operation of BHP predictor 820 when initiated thereby. The operating instructions can correspond to an algorithm or algorithms that predict a BHP of a given pump in a fluid of interest at a design RPM.

BHP predictor system 800 can be part of another computing system, such as a laptop, tablet, smartphone, desktop computer, server, data center, cloud environment, well site controller, the well system analyzer, and other computing systems. BHP predictor system 800 can be implemented on a general computing system or a specialized computing system. BHP predictor can be located proximate the pump implementation location or be located a distance away, for example, a lab or office environment. BHP predictor system 800 can be implemented for different types of pumps, for example, centrifugal pumps, rotary pumps, and metering pumps. BHP predictor system 800 can be implemented for various industries and fields, such as hydrocarbon production industry, medical field, and chemical and petrochemical fields. These example implementations require the pumping of a viscous fluid in an environment where the pump's published specifications are not adequate to evaluate pump efficiency.

It is understood that methods and processes described herein can be applicable to a centrifugal pump and other types of pumps, such as a positive displacement pump, a rotary pump and a metering pump, that may be used in handling viscous fluid. It is also understood that in addition to well production, the methods and processes can be used in other oil industry applications, such as in mud pump performance control and monitoring, and chemical injection application in the oil well, e.g., for viscosity, scale inhibition, sand control. In some aspects, it can be used in non-hydrocarbon industry applications, such as in medical fields for blood flow control and monitoring, e.g., a measure of medicine transfer rate, and in chemical and petrochemical industry for control and monitoring injection and mixing of chemicals for proper chemical reactions.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Aspects disclosed herein includes:

A. A method to predict a design BHP of a pump, including: (1) selecting a design RPM of the pump, (2) computing an original K-R number using a viscosity of a fluid, and an original flow rate and a first BHP of the pump, wherein the computing is performed under controlled environmental conditions, (3) generating a normalized K-R number utilizing the original K-R number and a BEP K-R number, and a normalized flow rate utilizing the original flow rate and a BEP flow rate, wherein the BEP K-R number and the BEP flow rate are computed for the pump using water performance specifications, and (4) calculating the design BHP for the design RPM, wherein a BEP BHP is determined for the design RPM, and the design BHP is equal to ((the normalized flow rate^B*the BEP BHP)/the normalized K-R number), wherein B is equal to two when the viscosity is an absolute viscosity and B is equal to one when the viscosity is a kinematic viscosity.

B. A system to determine a design BHP of a pump, including: (1) an interface capable of receiving benchmark specifications for the pump, and receiving user inputs, and (2) a BHP predictor, communicatively coupled to the interface and the memory, capable of computing one or more types of K-R numbers for a design RPM, determining BEP parameters, converting fluid viscosity, converting flow rates, normalizing the K-R numbers and the flow rates, and calculating a design BHP, utilizing benchmark specifications.

C. A computer program product having a series of operating instructions stored on a non-transitory computer-readable medium that directs a data processing apparatus when executed thereby to perform operations to predict a design BHP of a pump, the operations include: (1) selecting a design RPM of the pump, (2) computing an original K-R number using a viscosity of a fluid, and an original flow rate and a first BHP of the pump, wherein the computing is performed under controlled environmental conditions, (3) generating a normalized K-R number utilizing the original K-R number and a BEP K-R number, and a normalized flow rate utilizing the original flow rate and a BEP flow rate, wherein the BEP K-R number and the BEP flow rate are computed for the pump using water performance specifications, and (4) calculating the design BHP for the design RPM, wherein a BEP BHP is determined for the design RPM, and the design BHP is equal to ((the normalized flow rate^B*the BEP BHP)/the normalized K-R number), wherein B is equal to two when the viscosity is an absolute viscosity and B is equal to one when the viscosity is a kinematic viscosity.

Each of aspects A, B and C can have one or more of the following additional elements in combination. Element 1: wherein the BEP K-R number is a normalized BEP K-R number. Element 2: generating a benchmark BEP K-R number using the water performance specifications and a benchmark RPM of the pump. Element 3: modifying the normalized BEP K-R number for the design RPM. Element 4: wherein the normalized BEP K-R number is equal to (the benchmark BEP K-R number*(the benchmark RPM/the design RPM)AA)). Element 5: wherein A is equal to four when the viscosity is an absolute viscosity. Element 6: A is equal to 2.5 when the viscosity is a kinematic viscosity. Element 7: adjusting benchmark specifications using the design RPM. Element 8: where an adjusted flow rate is equal to (a benchmark flow rate*(the design RPM/a benchmark RPM)). Element 9: an adjusted BHP is equal to (a benchmark BHP*(the design RPM/a benchmark RPM)^3). Element 10: determining the normalized BEP K-R number using the adjusted flow rate and the adjusted BHP. Element 11: wherein the viscosity is an absolute viscosity and the original flow rate is a mass flow rate, and the computing of the original K-R number is equal to (the mass flow rate^2.0)/(the BHP*the absolute viscosity). Element 12: wherein the viscosity is a kinematic viscosity and the original flow rate is a mass flow rate, and the original K-R number is equal to (the mass flow rate*the kinematic viscosity^0.5)/(the design RPMA0.5*the BEP BHP). Element 13: wherein the original flow rate is a volumetric flow rate and the computing converts the volumetric flow rate to a mass flow rate using a density of the fluid. Element 14: wherein the pump is one of a centrifugal pump, a rotary pump, a positive displacement pump, or a metering pump. Element 15: wherein the pump is utilized in a medical field, a chemical field, a petrochemical field, or a hydrocarbon production field. Element 16: wherein the design BHP is utilized to predict a motor parameter for the pump, and the pump is one of a mud pump, an hydrocarbon pump, a slurry pump, a hydraulic pump, a sand pump, or a brine pump. Element 17: analyzing a well operation plan utilizing the design BHP, the pump, the viscosity of the fluid, and the motor parameter to determine parameters of the pump and a quantity of stages for the pump. Element 18: wherein the parameters of the pump include the design RPM, a stage diameter, a design flow rate, a hydraulic design, a head value, and a fluid viscosity handling. Element 19: wherein the BHP predictor is further capable of performing calculations. Element 20: a normalized BEP K-R number is equal to (a benchmark BEP K-R number*(a benchmark RPM*(a benchmark RPM/the design RPM)^5)). Element 21: an original K-R number is equal to (a mass flow rate^2.0)/(a BEP BHP*an absolute viscosity). Element 22: an original K-R number is equal to (a mass flow rate*a kinematic viscosity^0.5)/(the design RPMA0.5*a BEP BHP). Element 23: wherein the BHP predictor is further capable of implementing affinity laws. Element 24: an adjusted flow rate is equal to (a benchmark flow rate*(the design RPM/a benchmark RPM)). Element 25: an adjusted BHP is equal to (a benchmark BHP*(the design RPM/a benchmark RPM)^3). Element 26: wherein the design BHP is utilized to predict a motor parameter for the pump, and the pump is one of a mud pump, an hydrocarbon pump, a slurry pump, a hydraulic pump, a sand pump, or a brine pump. Element 27: a well system analyzer capable of analyzing a well operation plan utilizing the design BHP, the pump, the fluid viscosity, and the motor parameter to determine parameters of the pump and a quantity of stages of the pump, wherein the parameters of the pump include the design RPM, a stage diameter, the flow rate, a hydraulic design, a head value, and a fluid viscosity handling.

What is claimed is:

1. A method to predict a design brake horsepower (BHP) of a pump, comprising:
    selecting a design rotations per minute (RPM) of the pump;
    computing an original Ketan-Robert (K-R) number using a viscosity of a fluid, and an original flow rate and a first BHP of the pump, wherein the computing is performed under controlled environmental conditions;
    generating a normalized K-R number utilizing the original K-R number and a best efficiency point (BEP) K-R number, and a normalized flow rate utilizing the original flow rate and a BEP flow rate, wherein the BEP K-R number and the BEP flow rate are computed for the pump using water performance specifications;
    calculating the design BHP for the design RPM, wherein a Best Efficiency Point Brake Horse Power is determined for the design RPM, and the design BHP is equal to ((the normalized flow rate^B*the Best Efficiency Point Brake Horse Power)/the normalized K-R number), wherein B is equal to two when the viscosity is an absolute viscosity and B is equal to one when the viscosity is a kinematic viscosity; and
    modifying a size of the pump based on the design BHP.

2. The method as recited in claim 1, wherein the BEP K-R number is a normalized BEP K-R number, further comprising:
    generating a benchmark BEP K-R number using the water performance specifications and a benchmark RPM of the pump; and
    modifying the normalized BEP K-R number for the design RPM, wherein the normalized BEP K-R number is equal to (the benchmark BEP K-R number*(the benchmark RPM/the design RPM)^A)), wherein A is equal to four when the viscosity is an absolute viscosity and A is equal to 2.5 when the viscosity is a kinematic viscosity.

3. The method as recited in claim 1, wherein the BEP K-R number is a normalized BEP K-R number, further comprising:
    adjusting benchmark specifications using the design RPM, where an adjusted flow rate is equal to (a benchmark flow rate*(the design RPM/a benchmark RPM)) and an adjusted BHP is equal to (a benchmark BHP*(the design RPM/a benchmark RPM)^3); and
    determining the normalized BEP K-R number using the adjusted flow rate and the adjusted BHP.

4. The method as recited in claim 1, wherein the viscosity is an absolute viscosity and the original flow rate is a mass flow rate, and the computing of the original K-R number is equal to (the mass flow rate^2.0)/(the BHP*the absolute viscosity).

5. The method as recited in claim 1, wherein the viscosity is a kinematic viscosity and the original flow rate is a mass flow rate, and the original K-R number is equal to (the mass flow rate*the kinematic viscosity^0.5)/(the design RPM^0.5*the Best Efficiency Point Brake Horse Power).

6. The method as recited in claim 1, wherein the original flow rate is a volumetric flow rate and the computing converts the volumetric flow rate to a mass flow rate using a density of the fluid.

7. The method as recited in claim 1, wherein the pump is one of a centrifugal pump, a rotary pump, a positive displacement pump, or a metering pump.

8. The method as recited in claim 1, wherein the pump is utilized in a medical field, a chemical field, a petrochemical field, or a hydrocarbon production field.

9. The method as recited in claim 1, wherein the design BHP is utilized to predict a motor parameter for the pump, and the pump is one of a mud pump, an hydrocarbon pump, a slurry pump, a hydraulic pump, a sand pump, or a brine pump.

10. The method as recited in claim 9, further comprising:
    analyzing a well operation plan utilizing the design BHP, the pump, the viscosity of the fluid, and the motor parameter to determine parameters of the pump and a quantity of stages for the pump, wherein the parameters of the pump include the design RPM, a stage diameter, a design flow rate, a hydraulic design, a head value, and a fluid viscosity handling.

11. A system to determine a design brake horsepower (BHP) of a pump, comprising:
    an interface capable of receiving benchmark specifications for the pump, and receiving user inputs; and
    a processing unit that is communicatively coupled to the interface and the memory, and capable of computing one or more types of Ketan-Robert (K-R) numbers for a design rotations per minute (RPM), determining best efficiency point (BEP) parameters, converting fluid viscosity, converting flow rates, normalizing the K-R numbers and the flow rates, calculating a design BHP utilizing benchmark specifications, and modifying a size of the pump based on the design BHP.

12. The system as recited in claim 11, wherein the BHP predictor is further capable of performing calculations comprising:
   a normalized BEP K-R number is equal to (a benchmark BEP K-R number*(a benchmark RPM*(a benchmark RPM/the design RPM)^5));
   an original K-R number is equal to (a mass flow rate^2.0)/(a Best Efficiency Point Brake Horse Power*an absolute viscosity); and
   an original K-R number is equal to (a mass flow rate*a kinematic viscosity^0.5)/(the design RPM^0.5*the Best Efficiency Point Brake Horse Power).

13. The system as recited in claim 11, wherein the BHP predictor is further capable of implementing affinity laws, comprising:
   an adjusted flow rate is equal to (a benchmark flow rate*(the design RPM/a benchmark RPM)); and
   an adjusted BHP is equal to (a benchmark BHP*(the design RPM/a benchmark RPM)^3).

14. The system as recited in claim 11, wherein the design BHP is utilized to predict a motor parameter for the pump, and the pump is one of a mud pump, an hydrocarbon pump, a slurry pump, a hydraulic pump, a sand pump, or a brine pump.

15. The system as recited in claim 11, wherein the processing unit is further capable of analyzing a well operation plan utilizing the design BHP, the pump, the fluid viscosity, and the motor parameter to determine parameters of the pump and a quantity of stages of the pump, wherein the parameters of the pump include the design RPM, a stage diameter, the flow rate, a hydraulic design, a head value, and a fluid viscosity handling.

16. A computer program product having a series of operating instructions stored on a non-transitory computer-readable medium that directs a data processing apparatus when executed thereby to perform operations to predict a design brake horsepower (BHP) of a pump, the operations comprising:
   selecting a design rotations per minute (RPM) of the pump;
   computing an original Ketan-Robert (K-R) number using a viscosity of a fluid, and an original flow rate and a first BHP of the pump, wherein the computing is performed under controlled environmental conditions;
   generating a normalized K-R number utilizing the original K-R number and a best efficiency point (BEP) K-R number, and a normalized flow rate utilizing the original flow rate and a BEP flow rate, wherein the BEP K-R number and the BEP flow rate are computed for the pump using water performance specifications;
   calculating the design BHP for the design RPM, wherein a Best Efficiency Point Brake Horse Power is determined for the design RPM, and the design BHP is equal to (((the normalized flow rate^B*the Best Efficiency Point Brake Horse Power)/the normalized K-R number), wherein B is equal to two when the viscosity is an absolute viscosity and B is equal to one when the viscosity is a kinematic viscosity; and
   modifying a size of the pump based on the design BHP.

17. The computer program product as recited in claim 16, wherein the BEP K-R number is a normalized BEP K-R number, further comprising:
   generating a benchmark BEP K-R number using the water performance specifications and a benchmark RPM of the pump; and
   modifying the normalized BEP K-R number for the design RPM, wherein the normalized BEP K-R number is equal to (the benchmark BEP K-R number*(the benchmark RPM/the design RPM)^A)), wherein A is equal to four when the viscosity is an absolute viscosity and A is equal to 2.5 when the viscosity is a kinematic viscosity.

18. The computer program product as recited in claim 16, wherein the BEP K-R number is a normalized BEP K-R number, further comprising:
   adjusting benchmark specifications using the design RPM, where an adjusted flow rate is equal to (a benchmark flow rate*(the design RPM/a benchmark RPM)) and an adjusted BHP is equal to (a benchmark BHP*(the design RPM/a benchmark RPM)^3); and
   determining the normalized BEP K-R number using the adjusted flow rate and the adjusted BHP.

19. The computer program product as recited in claim 16, wherein the design BHP is utilized to predict a motor parameter for the pump, and the pump is one of a mud pump, an hydrocarbon pump, a slurry pump, a hydraulic pump, a sand pump, or a brine pump, and analyzing a well operation plan utilizing the design BHP, the pump, the viscosity of the fluid, and the motor parameter to determine parameters of the pump and a quantity of stages for the pump, wherein the parameters of the pump include the design RPM, a stage diameter, a design flow rate, a hydraulic design, a head value, and a fluid viscosity handling.

20. The computer program product as recited in claim 16, wherein the pump is one of a centrifugal pump, a rotary pump, a positive displacement pump, or a metering pump.

* * * * *

UNITED STATES PATENT AND TRADEMARK OFFICE
CERTIFICATE OF CORRECTION

PATENT NO. : 11,378,474 B2
APPLICATION NO. : 16/731240
DATED : July 5, 2022
INVENTOR(S) : Ketankumar Kantilal Sheth and Robert Charles de Long It is certified that error appears in the above-identified patent and that said Letters Patent is hereby corrected as shown below:

In the Specification

In Column 16, Line 56, after "the benchmark RPM/the design" delete "RPM)AA))." and insert --RPM)^A)).--

In Column 17, Line 6, delete "RPMA0.5 *" and insert --RPM^0.5 *--

In Column 17, Line 31, after "(the design" delete "RPMA0.5 *" and insert --RPM^0.5 *--

Signed and Sealed this
Twentieth Day of September, 2022

Katherine Kelly Vidal
*Director of the United States Patent and Trademark Office*